United States Patent
Malone et al.

(10) Patent No.: US 7,333,829 B2
(45) Date of Patent: Feb. 19, 2008

(54) MULTI-MODE WIRELESS BRIDGE SYSTEM AND METHOD USING A SINGLE-RADIO TRANSCEIVER

(75) Inventors: Lawrence J. Malone, Carlsbad, CA (US); Lon W. Christensen, San Diego, CA (US)

(73) Assignee: Quorum Systems, San Diego, CA (US)

( * ) Notice: Subject to any disclaimer, the term of this patent is extended or adjusted under 35 U.S.C. 154(b) by 214 days.

(21) Appl. No.: 10/807,042

(22) Filed: Mar. 22, 2004

(65) Prior Publication Data

US 2004/0192219 A1 Sep. 30, 2004

Related U.S. Application Data

(60) Provisional application No. 60/456,509, filed on Mar. 24, 2003.

(51) Int. Cl.
*H04B 7/15* (2006.01)
(52) U.S. Cl. ............... 455/552.1; 455/11.1; 455/41.2; 370/401
(58) Field of Classification Search ........ 455/450, 455/455, 428, 425, 426.2, 434, 435.2, 553.1, 455/552.1, 11.1, 15, 19, 41.2; 370/466, 492, 370/467; 375/211, 214, 220
See application file for complete search history.

(56) References Cited

U.S. PATENT DOCUMENTS

| | | | |
|---|---|---|---|
| 6,132,306 A * | 10/2000 | Trompower | 455/11.1 |
| 6,295,461 B1 * | 9/2001 | Palmer et al. | 455/557 |
| 6,404,775 B1 * | 6/2002 | Leslie et al. | 370/466 |
| 6,697,345 B1 * | 2/2004 | Corrigan et al. | 370/330 |
| 6,768,896 B2 * | 7/2004 | Tjalldin et al. | 455/11.1 |
| 6,957,069 B2 * | 10/2005 | Shah et al. | 455/436 |
| 7,151,925 B2 * | 12/2006 | Ting et al. | 455/418 |
| 2002/0132636 A1 * | 9/2002 | Stockhusen | 455/553 |
| 2003/0125066 A1 * | 7/2003 | Habetha | 455/522 |
| 2003/0157951 A1 * | 8/2003 | Hasty, Jr. | 455/519 |
| 2004/0087268 A1 * | 5/2004 | Hatano | 455/7 |
| 2004/0127214 A1 * | 7/2004 | Reddy et al. | 455/426.2 |
| 2004/0147262 A1 * | 7/2004 | Lescuyer et al. | 455/434 |
| 2004/0162022 A1 * | 8/2004 | Lahetkangas et al. | 455/41.1 |
| 2004/0185777 A1 * | 9/2004 | Bryson | 455/41.1 |
| 2004/0203709 A1 * | 10/2004 | Luneau | 455/422.1 |
| 2004/0203788 A1 * | 10/2004 | Fors et al. | 455/439 |
| 2004/0235468 A1 * | 11/2004 | Luebke et al. | 455/426.1 |
| 2004/0266340 A1 * | 12/2004 | Ivanov et al. | 455/11.1 |
| 2005/0176452 A1 * | 8/2005 | Perlman | 455/500 |
| 2006/0063485 A1 * | 3/2006 | Gainey et al. | 455/15 |

OTHER PUBLICATIONS

U.S. Appl. No. 60/415,281, filed Oct. 1, 2002, for which the benefit is claimed under 35 USC 119(e) by U.S. Appl. No. 10/675,893 (Pub. No. 2004/0127214 A1).

* cited by examiner

*Primary Examiner*—Blane J. Jackson
(74) *Attorney, Agent, or Firm*—Townsend and Townsend and Crew (57) ABSTRACT

A system and method are provided for communicating utilizing a plurality of different communication standards. To accomplish this, included is a single transceiver that utilizes a plurality of different communication standards.

16 Claims, 11 Drawing Sheets

MULTI-MODE WIRELESS BRIDGE SYSTEM AND METHOD USING A SINGLE-RADIO TRANSCEIVER

RELATED APPLICATION(S)

This application claims the benefit of U.S. Provisional Application No. 60/456,509, filed Mar. 24, 2003, entitled METHOD FOR IMPROVED MOBILE STATION TRANSCEIVER PERFORMANCE IN CELLULAR RADIO SYSTEMS.

FIELD OF THE INVENTION

The present invention relates to circuitry, and more particularly to radio transceiver systems.

BACKGROUND OF THE INVENTION

To facilitate the design and manufacture of wireless communication systems, a group of radio system experts codify the characteristics of a system into a standard. These characteristics typically include a specific operating radio frequencies, output power requirements, receiver sensitivity requirements, data rate requirements, communication protocols, security protocols, modulation types and spurious radio frequency emission requirements to name a few. Many standards exist for different wireless communication systems. These standards can be public domain or proprietary. Public standards include the well-known Global System for Mobile communication (GSM), Bluetooth™ and 802.11 standards.

Conventional practice is to design and optimize a radio transceiver targeted to a particular standard. For example, a radio transceiver to be used in a device that operates using the Bluetooth™ communication protocol is sized and customized to the Bluetooth™ protocol. Generally, the same can be said for radio transceivers designed for use in devices that operate using the IEEE 802.11 communication protocol.

However, there are many applications which need to operate in multiple communication protocol technologies, or operate multiple instances of the same communication protocol technology. In many of these applications, the information arrives on one communication protocol and is sent out on another communication protocol. For example, a GSM cellular telephone device may operate with a Bluetooth™ headset. The voice data is sent wireless from the headset to the cellular telephone on one communication standard, Bluetooth™, and then from the cellular telephone wirelessly to the cellular base station on another standard, GSM. Likewise, voice data might be received by a cellular handset from a cellular base station using the GSM standard and then retransmitted to the headset using Bluetooth™.

There is also a trend to reduce cost in wireless transceivers. On way to do so is to use a multi-mode radio that is capable of transmitting and receiving multiple standards rather than using one radio for each standard. While using a multi-mode radio lowers the cost of the system, the disadvantage is that typically only one standard can be transmitted or received at a time. In addition, most integrated circuit radios can not receive and transmit at the same time.

A multi-mode wireless bridge communicates to a plurality of other wireless systems, each of which may adhere to a different radio communication standard. The communication between two wireless devices is known as a link. A multi-mode wireless device can form links with other single-mode or multi-mode devices. Each link may adhere to a different communication standard. The bridge receives information on one link using a particular radio communication protocol, demodulates the signal to information bits, and then re-modulates and transmits on a different link using a different communication protocol.

Figure 1:
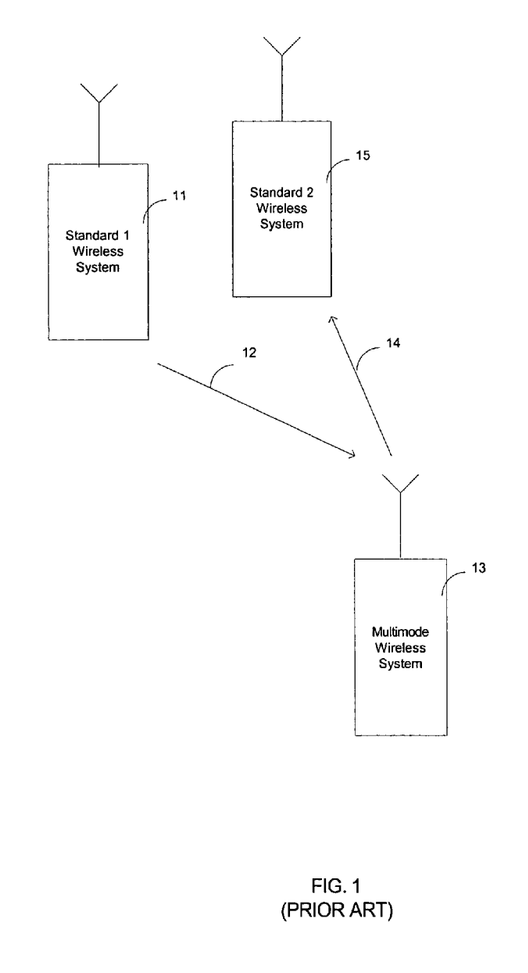
FIG. 1 illustrates the function of a multi-mode wireless bridge device.

As shown in FIG. 1, a single-mode wireless transceiver 11 uses a first wireless communication standard to send information over a wireless link 12 to the multi-mode wireless transceiver 13. The multi-mode wireless transceiver 13 receives the signals, converts them to a second radio communication standard and transmits them over a wireless link 14 to a second single-mode wireless transceiver 15. This second single-mode wireless transceiver, in general, adheres to a second radio communication standard different than the first radio communication standard.

In this way, the multi-mode wireless transceiver 13 has acted as a wireless bridge between the two single-mode wireless transceivers 11, 15. As an example, the radio communication standard described in this example could be Bluetooth™, HomeRF, 802.1a or GSM. In general, a multi-mode wireless system can communicate with many different devices using different radio communication standards and thus, acts as a bridge between many standards. A multi-mode wireless communication bridge is typically-made up of multiple transceivers each designed for a specific standard. For these transceivers to coexist, they are isolated from one another through the use of electronic shielding and filtering.

Figure 2:
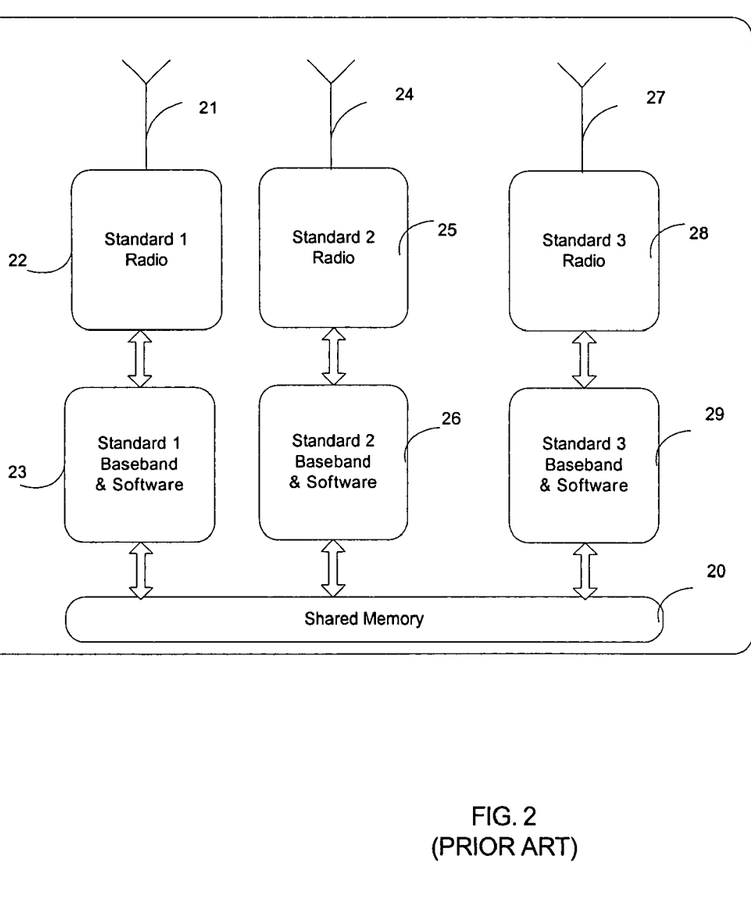
FIG. 2 is an implementation of a multi-mode wireless system.

FIG. 2 shows a traditional multi-mode wireless system supporting three standards. The first standard implemented in a multi-mode wireless communication system requires its own antenna 21, radio 22, and baseband sub-system 23 each tailored for the first standard. An additional standard in the multi-mode system requires another antenna 24, radio 25 and baseband sub-system 26. The third standard requires its own antenna 27, radio 28 and baseband sub-system 29. Each baseband sub-system can communicate to each other using a shared communication bus or shared memory 20. When a baseband system demodulates the incoming signal into information bits, it can send the information bits to a different baseband system for retransmission using a different standard. A plurality of standards can be bridged this way in a multi-mode system.

Consequently, it is desirable to provide a multi-mode radio transceiver system that can bridge between multi-standards using only a single transceiver.

SUMMARY OF THE INVENTION

A system and method are provided for communicating utilizing a plurality of different communication standards. To accomplish this, included is a single transceiver that utilizes a plurality of different communication standards.

In one embodiment, the single transceiver may receive signals utilizing a first communication standard. Thereafter, the signals may be demodulated into information bits. Optionally, the information bits may be buffered. Still yet, the information bits may be re-modulated into signals utilizing a second communication standard. Further, the single transceiver may transmit the signals.

In another embodiment, the single transceiver may utilize the plurality of different communication standards by multiplexing among the plurality of different communication standards.

In still another embodiment, the single transceiver may be coupled to an antenna sub-system capable of communicating utilizing the plurality of different communication standards. Still yet, the single transceiver may be coupled to a plurality of baseband sub-systems each capable of processing one of the communication protocols. Optionally, the baseband sub-systems may share memory.

As an option, the baseband sub-systems may be implemented utilizing a plurality of discrete processors. Further, the baseband sub-systems may be implemented utilizing a single integrated processor.

In still yet another embodiment, a time or duration of access to the single transceiver by the baseband sub-systems may be tracked. Further, each of the baseband sub-systems may access the single transceiver during assigned time intervals.

In use, the baseband sub-systems may optimize the frequency or duration of transmissions or receptions in order to minimize radio utilization, minimize spectrum utilization, maximize link throughput, and/or optimize a system parameter.

As an option, the baseband sub-systems may translate, code, or decode the information bits so as to make the information bits compatible with the plurality of different communication standards.

BRIEF DESCRIPTION OF THE DRAWINGS

Prior art

Prior art

DETAILED DESCRIPTION

Figure 3:
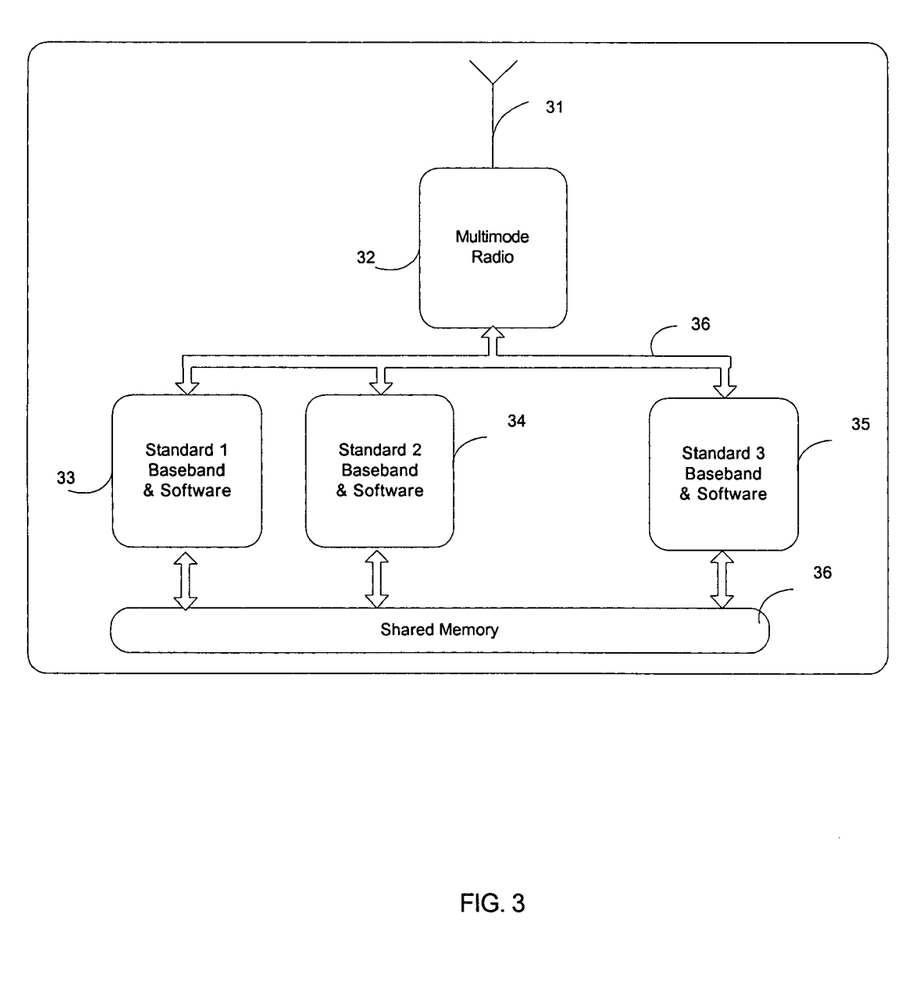
FIG. 3 illustrates one embodiment showing a multi-mode wireless transceiver with a single radio and multiple baseband sub-systems.

FIG. 3 represents an embodiment where a single multi-mode radio transceiver which is capable of transmitting and receiving multiple standards replaces the plurality of radios shown in FIG. 2. In the context of the present description, a single transceiver includes a transceiver embodied on one or more integrated platforms that are capable of utilizing a plurality of communication protocols. For example, the single transceiver may be implemented utilizing multiple sub-system processors. Further, the baseband sub-systems may be implemented utilizing a single integrated system processor.

In FIG. 3, a wireless communication bridge which supports three standards is shown. The system has one antenna 31 capable of transmitting and receiving multiple standards. Likewise, the system has a radio 32 capable of transmitting and receiving multiple standards, and the system has 3 baseband sub-systems 33, 34, 35 connected to the multi-mode radio.

The present embodiment may optionally include multi-mode radio which cannot both transmit and receive at the same time. Furthermore, for the purpose of this one embodiment, the multi-mode radio may optionally be only configured in one communication standard at any one instance in time. Each baseband system can communicate with each other using a shared communication bus or shared memory 36. When a baseband sub-system demodulates the incoming signal into information bits, it can send the information bits to a different baseband system for retransmission using a different standard. A plurality of standards can be bridged this way in a multi-mode system.

Figure 4:
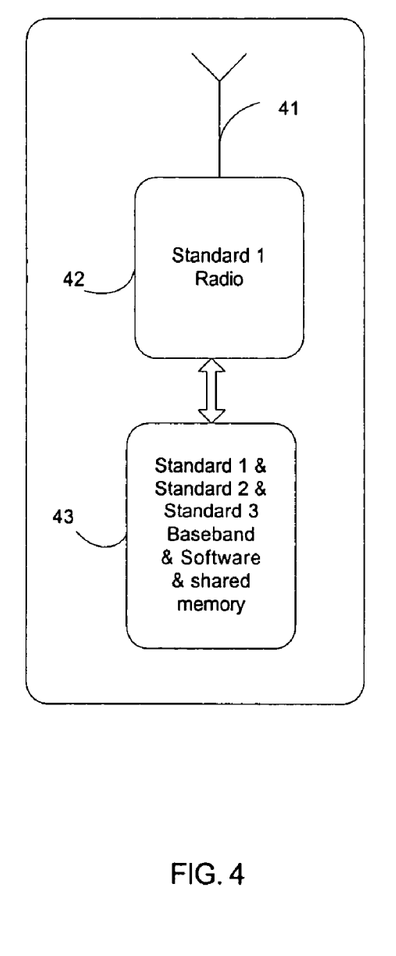
FIG. 4 illustrates one embodiment showing a multi-mode wireless system with a single radio and multiple baseband sub-systems implemented on a single baseband processor.

FIG. 4 represents an embodiment where not only a single multi-mode radio replaces the plurality of radios in FIG. 2, but a baseband system which supports many standards replaces the plurality of basebands in FIG. 2. In FIG. 4 a wireless communication system which supports three standards is shown. As an option, all of the components shown in FIG. 4 may be embodied on a single semiconductor platform.

The system has one antenna 41 capable of transmitting and receiving multiple standards. Likewise, the system has a radio 42 capable of transmitting and receiving multiple standards. Finally, the system has one baseband system 43 connected to the multi-mode radio. This baseband system supports the three (or some other number) standards and can retransmit information bits received using one standard on a different standard. A plurality of standards can be bridged this way in a multi-mode system.

Since only one radio exists in the system described in FIG. 3 and FIG. 4, such embodiments encompass a method to share the radio between the multiple standards and their associated baseband system(s).

Figure 5:
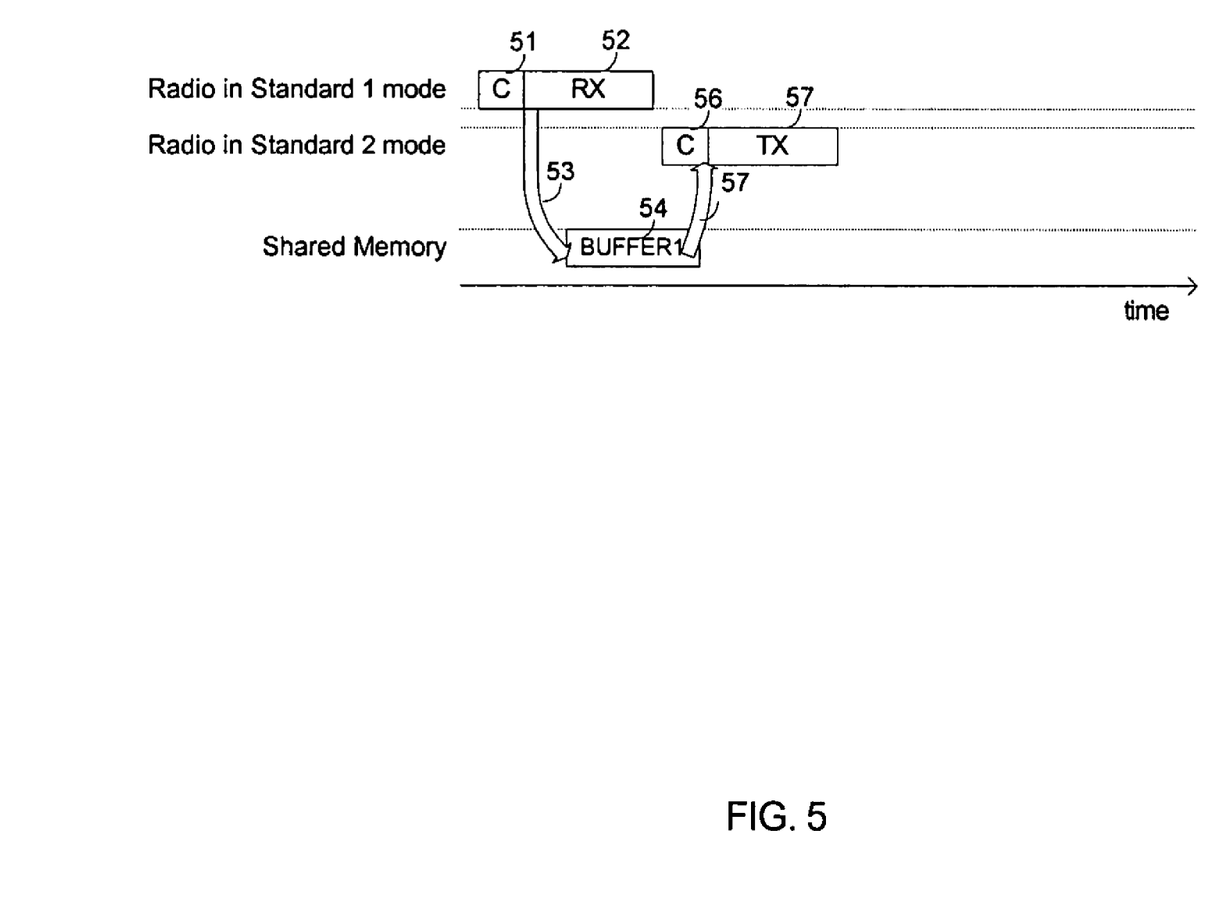
FIG. 5 illustrates the time-slicing mechanism of a single radio by multiple baseband sub-systems in a multi-mode wireless bridge.

Shown in FIG. 5 is the fundamental time slicing mechanism for one embodiment. The first baseband sub-system configures 51 the multi-mode radio to receive signals for a first standard and receives information for a period of time 52. As the first baseband system receives and demodulates the signal, it sends 53 the information received to a shared memory where it is buffered 54.

Next, the second baseband processor configures 56 the multi-mode radio to transmit signals for a second standard and starts retrieving the information buffered in the shared memory. The second baseband processor then transmits this information using a second standard 57. Through this method, a single-radio multi-mode transceiver can bridge information between multiple communication devices which adhere to different standards.

Wireless standards differ depending on what functions they have been optimized for. For example, cellular systems have a wide area of coverage but a low data rate. WLAN has a much smaller of coverage but a higher data rate. When bridging between disparate standards, one embodiment may encompass any mechanisms to optimally restructure and reorganize the information bits to minimize the time the radio is used or to maximize the throughput of the wireless links.

Figure 6:
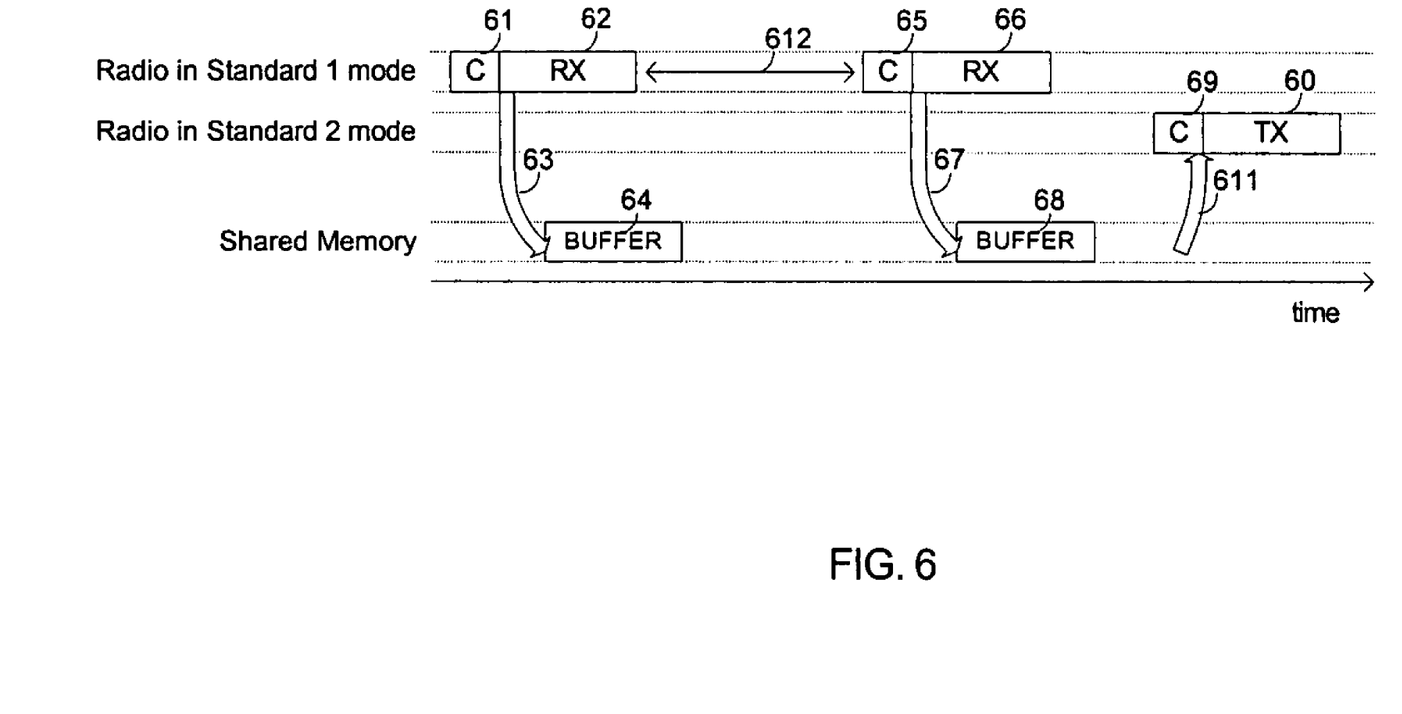
FIG. 6 illustrates the time-slicing mechanism of a single radio by multiple baseband sub-systems in a multi-mode wireless bridge.

For the purposes of the example in FIG. 6, Standard 1 is a lower data rate link than Standard 2. To optimize the system for minimal radio utilization, the system receives 2 packets of information for every one it transmits. To bridge the two Standards, the first baseband sub-system configures 61, 65 the radio to Standard 1 and receives 62, 66 the information.

After it receives the information from these two receptions 62, 66, the sub-system saves the information to a shared memory 63, 67 where it is stored 64, 68. Once enough data has been accumulated, the second baseband sub-system configures the radio 69, retrieves 611 both buffered groups of information bits, combines them, and transmits 60 them. By only transmitting 60 for every two receptions 62, 66, the multi-mode system can reduce the use of the radio. This allows the radio to enter a low-power mode of operation to conserve battery life 612 for example.

As a further extension, one embodiment may encompass mechanisms to convert the information bits from one standard to another standard. For example, the GSM standard uses one type of voice codec and the Bluetooth™ standard uses another type of voice codec. This implies that Bluetooth™ cannot use GSM voice codec information bits directory. The information must be re-coded in a format Bluetooth™ can understand. Thus, this one embodiment covers the ability to translate information bits between the two standards.

In such embodiment, after the radio receives the signal and a first baseband sub-system decodes the signal into information bits, then the first baseband sub-system or another baseband sub-system can translate those information bits into another group of information bits. These bits can then be modulated and transmitted by a second baseband sub-system.

In the previous examples, the information flow was unidirectional. However, this embodiment covers bridging wireless communication standards where the information flow is bidirectional. In this case, the bridging device both transmits and receives information on a first wireless link using a first radio communication protocol. In addition, on a second wireless link using a second radio communication protocol, the bridging device transmits and receives information. In use, the bridging device demodulates receptions, transfers the information bits between baseband sub-systems, and retransmits the information.

Figure 7:
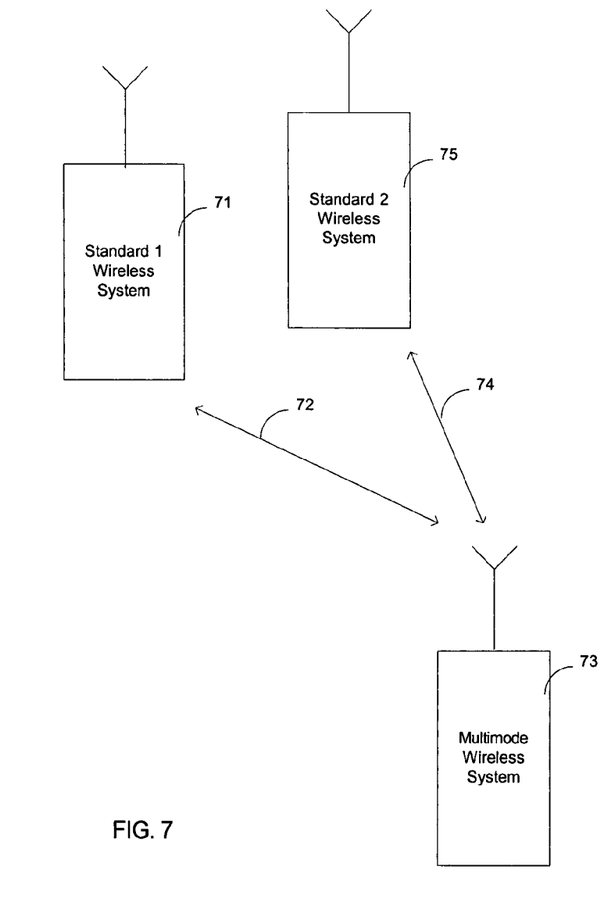
FIG. 7 illustrates the function of a two-way multi-mode wireless bridge device.

As shown in FIG. 7, a single-mode wireless transceiver 71 uses a first wireless communication standard to send and receive information over a wireless link 72 to the multi-mode wireless transceiver 73. Likewise, a second single-mode wireless transceiver 75 uses a second wireless communication standard to send and receive information over a second wireless link 74 to the multi-mode wireless transceiver 73. The multi-mode wireless transceiver 73 receives the signals, converts them to a different radio communication standard and retransmits them over a wireless links 72, 74 to a second single-mode wireless transceiver 75. In this way, the multi-mode wireless transceiver 73 has acted as a two-way wireless bridge between the two single-mode wireless transceivers 71, 75.

Since only one radio exists in the multi-mode bridge transceiver described in FIG. 7, this embodiment encompasses a method to share its radio between the multiple standards even when the wireless links are in two-way communications.

Figure 8:
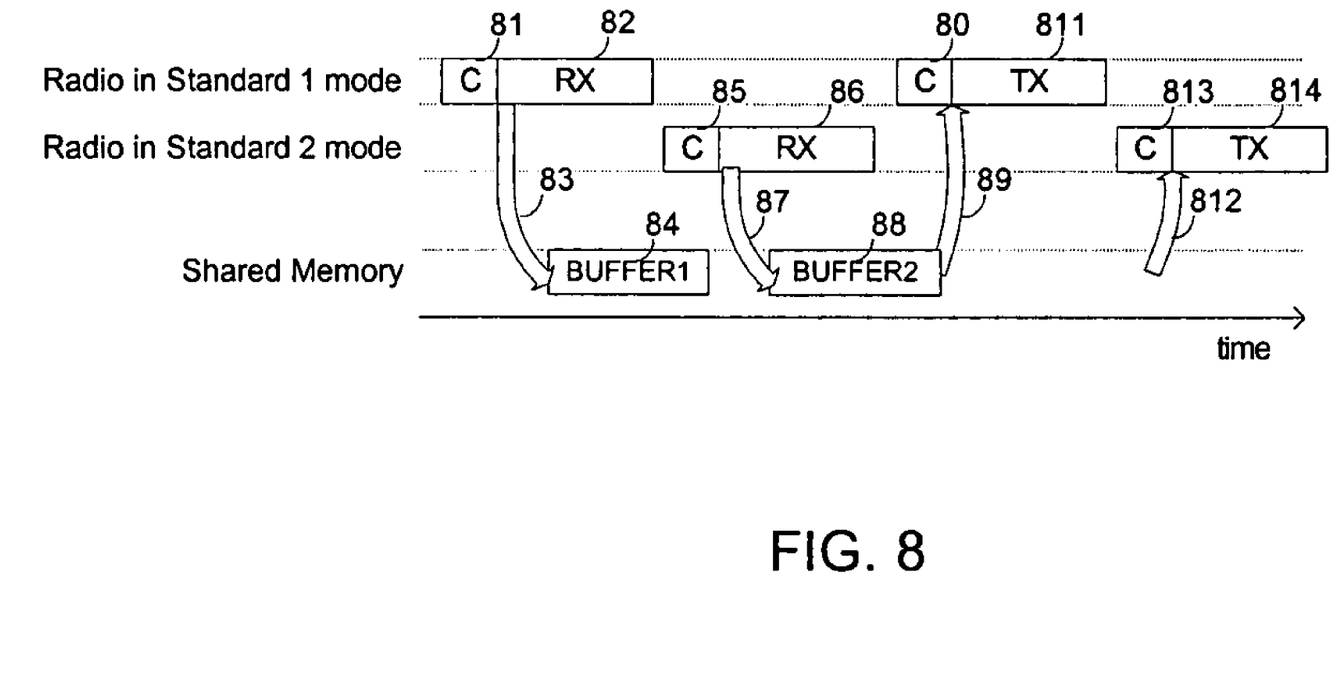
FIG. 8 illustrates the time-slicing mechanism of a single radio by multiple baseband sub-systems in a two-way multi-mode wireless bridge.

Shown in FIG. 8 is one embodiment of radio time-slicing for two-way links in a multi-mode bridge. The first baseband sub-system configures 81 the multi-mode radio to receive signals for a first standard and receives information for a period of time 82. As the first baseband system receives and demodulates the signal, it sends 83 the information received to a shared memory where it is buffered 84.

Next, the second baseband sub-system configures 85 the multi-mode radio to receive signals for a second standard and receives information for a period of time 86. As the second baseband system receives and demodulates the signal, it sends 87 the information received to a shared memory where it is buffered 88.

Further, the first baseband processor configures 86 the multi-mode radio to transmit 80 signals for the first standard and starts retrieving 89 the information buffered in the shared memory by the second baseband sub-system. The first baseband processor then transmits 811 this information using the first standard completing the bridge in one direction.

Finally, the second baseband processor configures 813 the multi-mode radio to transmit signals for the second standard and starts retrieving 812 the information buffered in the shared memory by the first baseband sub-system. The second baseband processor then transmits 814 this information using the second standard completing the two-way bi-directional bridge. This is but one sequence of actions to create a two-way wireless bridge with a single-radio multi-mode transceiver.

Using a single-radio multi-mode transceiver as a wireless bridge is a significant improvement over the prior art. Traditionally, multi-mode communication systems have a different radio for each communication standard it supports. This embodiment, on the other hand, requires only one radio, thus significantly reducing the cost of a multi-mode transceiver.

This embodiment described is but one embodiment. A person skilled in the art could develop other embodiments based on the one described. Specifically, in the examples of this description, only two communication devices were bridged using a single-radio multi-mode wireless bridge; however, this technology covers bridging more than two devices with more than two standards. In addition, actual radio standards such as GSM or 802.11 may have signaling structure implementations which differ from the generalized implementation described herein.

Figure 9:
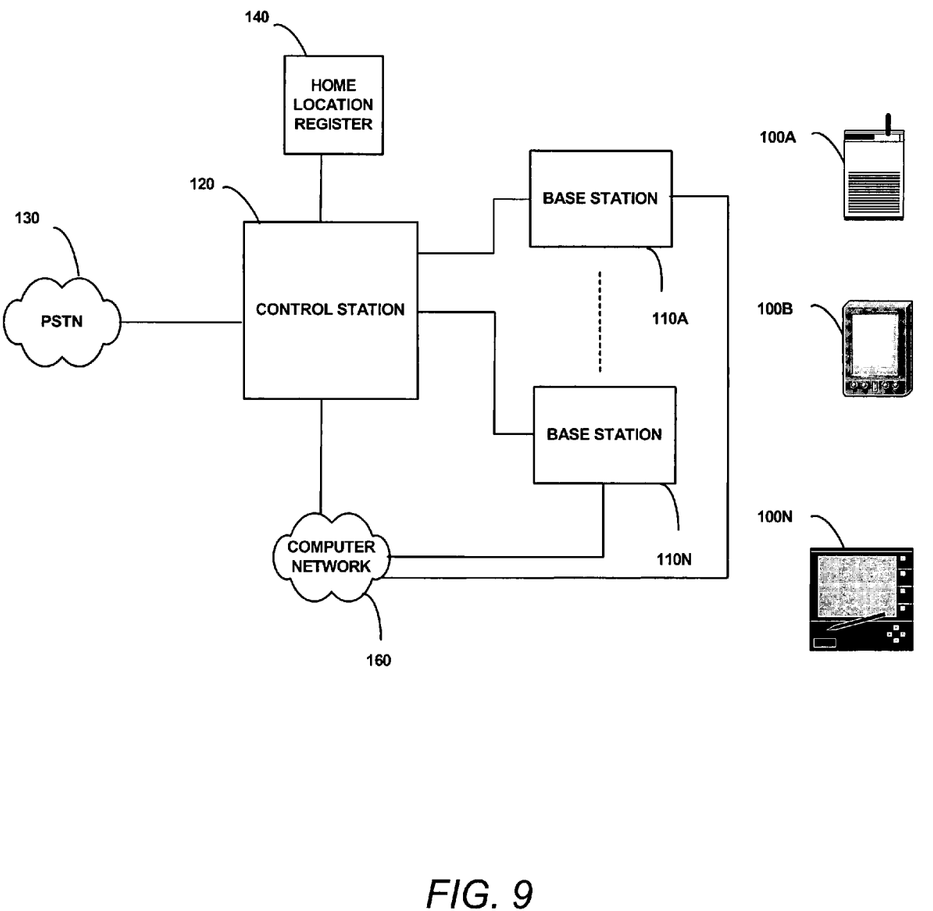
FIG. 9 is an illustration of a wireless communication system in which one embodiment may be used.

FIG. 9 is an illustration of a multi-mode wireless communication system in which one embodiment may be used. It should be understood that the components shown in FIG. 9 are merely representative of one mode of wireless communication system and that other communication systems may use different components in order to achieve similar, or even different results. For example, a wired transceiver communication system may also be employed. The claims, therefore, are not intended to be limited to the system shown in FIG. 9. For example, the present technology may be implemented in a single-mode system.

In the wireless communication system of FIG. 9, multi-mode, wireless communication devices, otherwise referred to herein simply as wireless communication devices, are shown as wireless communication devices 100*a*, 100*b*, and 100*n*, one or more wireless communication devices being assigned to each user in the system. The designations a, b, and n on the wireless communication device identifiers correspond respectively to a first user, a second user, and an nth user, representing "n" number of users in the communication system. Although only three wireless communication devices 100 are shown in FIG. 9, it should be understood that a wireless communication system typically comprises many thousands of users.

Referring again to FIG. 9 control station 120 typically includes interface and 25 processing circuitry for providing system control to base stations 110*a* through 110*n*, representing one through "n" base stations comprising the wireless communication system. Base stations are provided for transmitting and receiving communication signals to and from wireless communication devices. Each base station 110 provides a coverage area ranging up to several miles in radius from the base station location. As wireless communication devices travel within the coverage area of each base station, communication signals to be transferred to and from the wireless communication device are routed generally through the particular base station to which the wireless communication device is most closely located.

Control station 120 provides circuitry for routing communications between wireless communication devices operating in various base station coverage areas, as well as between remote stations and land-line telephone users through a Public Switch Telephone Network, shown in FIG. 9 as the PSTN 130. Control station 120 may, alternatively, or in addition to, be connected to computer network 160 to provide communications between wireless communication devices in the communication system and various known computing devices connected to computer network 160, such as personal computers, mainframe computers, digital cameras, email systems, remotely controlled devices, and so on.

Control station 120 typically comprises a telecommunications switch (not shown) and a Base Station Controller (BSC) (also not shown). The telecommunication switch provides a switching interface to PSTN 130 while the BSC provides the necessary hardware and software for communications to take place between base stations. Control station 120 provides other functions in the communication system as well, such as billing services and data services.

Control station 120 may be coupled to the base stations by various means such as dedicated telephone lines, optical fiber links, or microwave communication links. When a call is initiated by a wireless communication device, a paging message is transmitted to one or more base stations proximate to the wireless communication device initiating the call, generally over a paging channel. The paging message is routed to control station 120, where it is processed and routed either to PSTN 130 or to one or more base stations proximate to a wireless communication device for which the call is intended. When a call is initiated from PSTN 130, a paging message is received by control station 120 where it is then converted into a format suitable for the particular wireless communication system.

In the exemplary embodiment, the wireless communication device 100 is able to communicate in at least two modes, or types, of communications, data communications and voice communications. Data communication mode is used when it is desirous to send or receive information generally suitable for digital computational devices, such as laptop computers. Data is generally transmitted in discreet segments called packets. Each data packet generally contains overhead information used for a variety of purposes. For example, many data packets contain a data field used to store an error detection code. The error detection code may be used to check a received data packet to ensure that it was received intact; that is, the data was not corrupted during the transmission process.

Voice communication mode is used when it is desirous to transmit acoustic information, including human speech, facsimile tones, music, or other audible forms of communication. In voice communication mode, audio information is transmitted using one or more well-known wireless communication modulation techniques, such as CDMA, TDMA, AMPS, and others.

During typical voice communications, an over the air channel is established between one or more base stations and a wireless telephone. The channel is maintained throughout the duration of the voice call, no matter how much or little voice activity is occurring between the wireless telephone and the base station. In many instances, voice data is digitized and formatted into packets prior to transmission. Voice packets differ from data packets in that no information as to a destination address is contained within the voice packets. That is, a connection is first established between two locations, then voice data is transmitted between the two locations. No address information need be contained within the voice packets as the source and destination of the voice packets are predetermined by the connection.

Data mode may further include a capability of transmitting voice in certain applications. In this scenario, voice is digitized using techniques well known in the art. The digitized voice signals may be encrypted to provide for secure voice transmissions over the air. The digitized voice signals are then formatted into data packets, which are then transmitted over the air using well-known data transmission protocols. As explained above, each data packet contains information as to the address, or destination, of where the data packet is to arrive.

Figure 10:
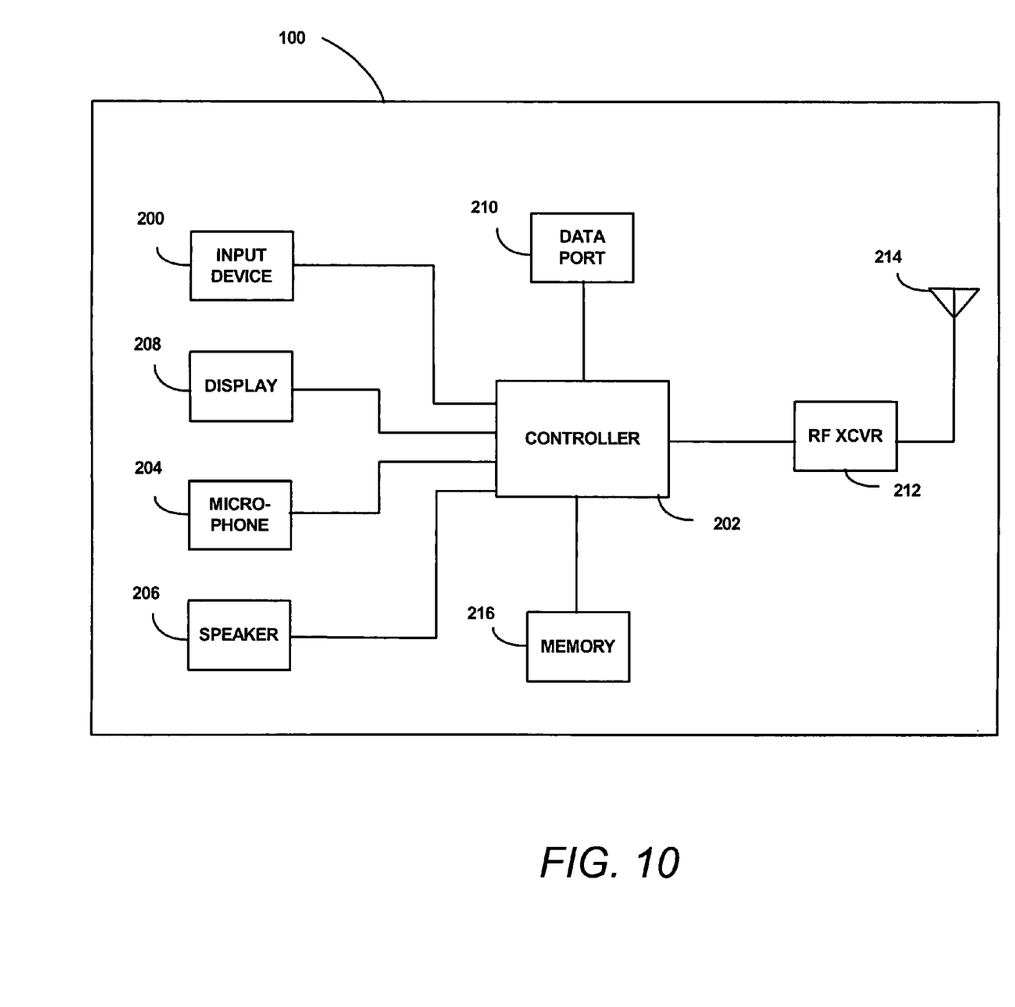
FIG. 10 illustrates the functional components of a wireless communication device, shown in block diagram format.

FIG. 10 illustrates the functional components of a wireless communication device, or wireless communication device, 100, shown in block diagram format. It should be understood that the components shown in FIG. 10 are merely representative of one mode of wireless communication device and that other communication devices may use different components in order to achieve similar, or even different results. The claims, therefore, are not intended to be limited to the system shown in FIG. 10.

Wireless communication device 100 is capable of multi-mode communications, meaning that it can operate in several modes of communications, such as voice communications or data communications. It should be understood that voice communications comprise any audio information including speech, music, or audible tones used for call processing, modems, and facsimile machines. Data communications comprise synchronous or asynchronous data transmission. In addition to these modes, wireless communication device is also capable of other modes of communications as well.

A user of wireless communication device 100 initiates communications generally by using input device 200. Input device 200 comprises a keypad in the exemplary embodiment, however, input device 200 could be any device which accepts user commands, such as a voice response device which converts voice commands into electrical signals suitable for processing by controller 202. During voice communications, the user speaks into microphone 204, which transforms acoustic energy into electrical energy and sends the electrical signals to controller 202 for processing.

Microphone 204 may be substituted for input device 200 in an application where a second audio input device is undesirable. In many instances, a voice encoder/decoder, generally known as a Codec, is used between microphone 204 and controller 202, or is incorporated within controller 202, to convert the electrical signals from microphone 204 into a format more suitable for transmission over a limited bandwidth air interface.

Speaker 206 is used to convert received electrical signals into acoustic signals. Speaker 206 may comprise a speaker suitable for low volume acoustic outputs, typically for use in a traditional telephone application, or speaker 206 may comprise a loudspeaker, suitable for high volume acoustic outputs, typically for use in a dispatch applications. In another embodiment, speaker 206 may comprise a combination of the high volume and low volume acoustic speakers.

Wireless communication device 100 further comprises display 208 for allowing a user to view operational characteristics of the wireless communication device. Such displays are common in many of today's wireless devices including telephones and remote data terminals.

Data port 210 serves as an interface between controller 202 and external hardware devices. Data port 210 generally allows a variety of bi-directional data communications to take place between wireless communication device 100 and the external device. Such external devices include laptop computers, facsimile machines, and remote data terminals, among others.

When a user initiates voice or data communications, an identification code corresponding to a second communication device, generally a telephone number, is entered using input device 200. In the exemplary embodiment, input device 200 comprises keys corresponding to digits 0 through 9, as well as additional function keys, such as SEND, END, and so forth. Input device 200 may also comprise one or more keys used to classify an outgoing communication as being a data communication or a voice communication.

For example, a user wishing to initiate a data communication might press a key designated for data communications, then dial a telephone number corresponding to a data device that the user wishes to communicate with. In one embodiment, all calls from wireless communication device 100 are assumed to be voice calls, unless classified as some other mode of communication, as described by one of the methods above.

Controller 202 serves as the main computational unit of wireless communication device 100. Although controller 202 is shown as a single element in FIG. 10, it should be understood that controller 202 may comprise one or more individual components such as one or more Application Specific Integrated Circuits (ASICs) in combination with memory devices, bus controllers, and other support devices well known to those skilled in the art.

To facilitate the transmission and receipt of wireless RF signals in the foregoing context, an RF transceiver 212 and an antenna 214 are coupled to controller 202 for sending and receiving such signals. Similar to the controller 202, one or more ASICs in combination with memory devices, bus controllers, etc. may be used to provide the RF transceiver 212. Moreover, the aforementioned direct-conversion receiver may be incorporated into the RF transceiver 212 and/or controller 202 in any desired capacity for providing an improved system.

Working in conjunction with the controller 202 is memory 216. The memory 216 is a device used to store information represented in digital format. Examples of memory 216 include random access memory (RAM), electrically erasable programmable read-only memory (EEPROM), non-volatile memory, and other known storage devices.

Single radio multi-mode bridge transceivers described herein lead to a group of applications, namely, communication networks which use the technology herein. For example, multi-mode mesh networking can use the single radio multi-mode bridge as described herein to improve performance of a typical mesh network.

Mesh networks provide for robust wireless communications between distant wireless transceivers by using multiple redundant wireless transceivers as intermediary information repeaters. If a subset of these intermediary transceivers becomes non-operational, the system as a whole will continue to provide communication conduits through the mesh. Another specific advantage of a mesh network is that it provides a method to extend wireless coverage.

For example, in use, cellular telephones coverage can be blocked by buildings or hills. Small cellular repeaters can be put on the buildings or hills to route the cellular signals around the obstacle. By using single-radio multi-mode bridge transceivers as described herein in a mesh network, the flexibility of a mesh network to route signals around obstacles is increased, or spectrum efficiency is optimized while keeping the costs of the individual bridge transceivers low.

Figure 11:
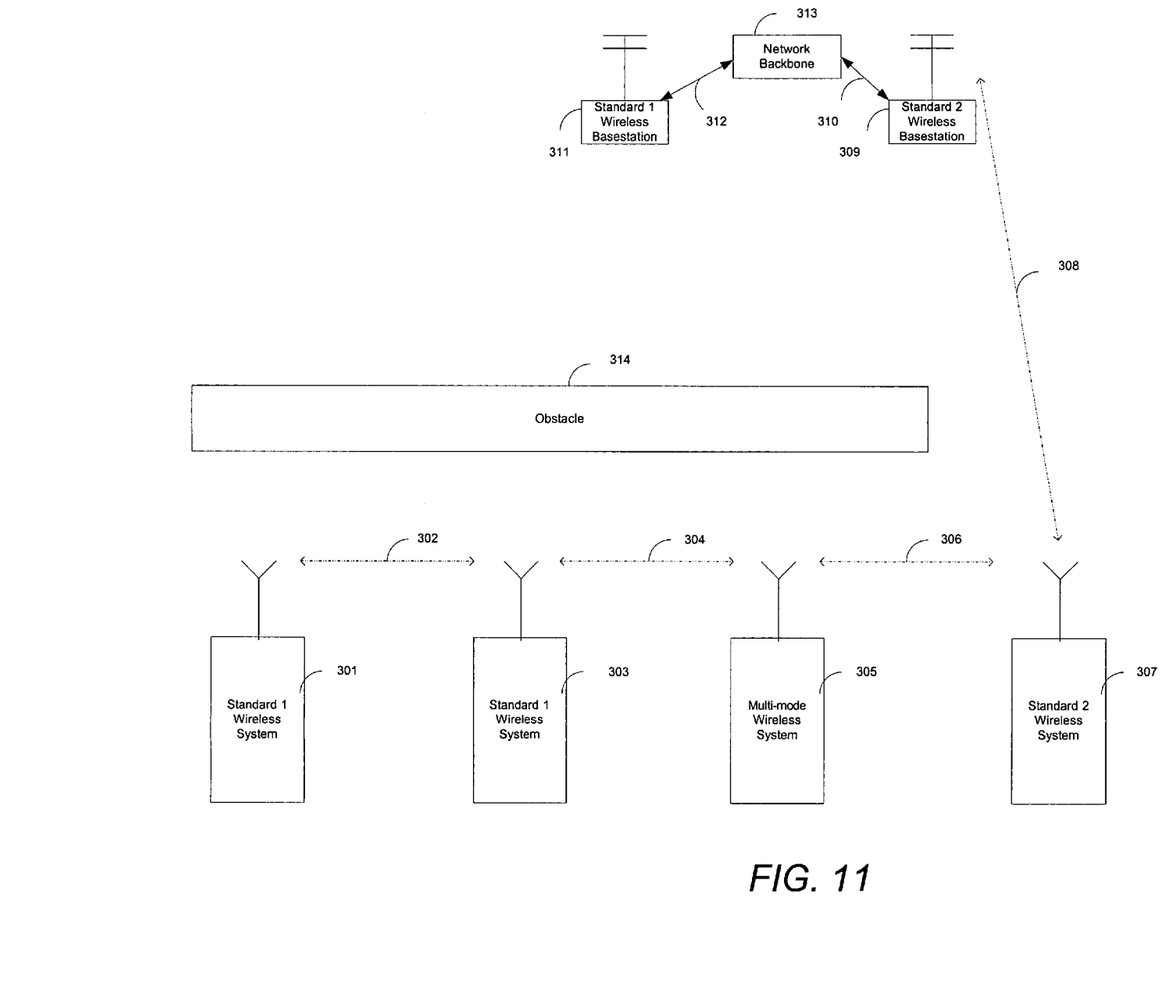
FIG. 11 is an illustration of another wireless communication system in which one embodiment may be used.

An example of such a system is illustrated in FIG. 11. In FIG. 11, a single-mode transceiver 301 using a first communication standard denoted Standard 1 in the figure sends and receives information from a remote network 313; however, an obstacle 314 prevents the wireless transceiver 301 from establishing a link to a Standard 1 Basestation 311 which is attached 312 to the network 313. A mesh network provides an alternative path to establish the connection.

In the example in FIG. 11, the single-mode transceiver 301 can establish a wireless link 302, using the first wireless communication standard denoted Standard 1 in the figure, to another single-mode transceiver 303. Thus, the first transceiver 301 can send and receive information to the second transceiver 303. In a similar manner, the second transceiver can establish a wireless link 304 using Standard 1 to a third transceiver 305 which is a single-radio multi-mode bridging transceiver. This bridging transceiver 305 can buffer information and then retransmit it using a second wireless standard denoted Standard 2 in FIG. 11 to another single-mode wireless communication transceiver 307. This single-mode transceiver 307 only communicates using wireless Standard 2. This transceiver 307 repeats information over a wireless link 308 to a Standard 2 wireless basestation 309 which is connected 310 to the wired network 313. In this way, a single-radio multi-mode bridge is able to extend the range of a mesh network by bridging information between different standards. This is but one application where a single-radio multi-mode wireless bridge system would be useful.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A single transceiver system for utilizing a plurality of different communication standards, comprising:

a single transceiver selectably configurable to a plurality of different communication standards;

a memory configured to store information received by the single transceiver utilizing a first communication standard, and configured to provide the information to the single transceiver for transmission according to a second communication standard; and a plurality of baseband sub-systems coupled to the signal transceiver, each of the plurality of baseband sub-systems capable of processing one of the plurality of communication standards, and wherein each of the baseband sub-systems share memory, and wherein the baseband sub-systems optimize a frequency or duration of transmissions or receptions in order to at least one of minimize a radio utilization, minimize a spectrum utilization, maximize a link throughput, and optimize a system parameter.

2. The system as recited in claim 1, wherein the single transceiver demodulates received signals into information bits.

3. The system as recited in claim 2, wherein the single transceiver re-modulates the information bits into signals utilizing the second communication standard.

4. The system as recited in claim 1, wherein the single transceiver utilizes the plurality of different communication standards by time multiplexing therebetween.

5. The system as recited in claim 1, wherein the single transceiver is coupled to an antenna sub-system capable of communicating utilizing the plurality of different communication standards.

6. The system as recited in claim 1, wherein the baseband sub-systems are implemented utilizing a plurality of discrete processors.

7. A single transceiver system for utilizing a plurality of different communication standards, comprising:
a single transceiver selectably configurable to a plurality of different communication standards;
a memory configured to store information received by the single transceiver utilizing a first communication standard, and configured to provide the information to the single transceiver for transmission according to a second communication standard; and
a plurality of baseband sub-systems implemented utilizing a single integrated processor and coupled to the single transceiver, each of the plurality of baseband sub-systems capable of processing one of the plurality of communication standards, and wherein each of the baseband sub-systems share memory.

8. The system as recited in claim 1, wherein at least one of a time and a duration of access to the single transceiver by the baseband sub-systems is tracked.

9. The system as recited in claim 8, wherein each of the baseband sub-systems access the single transceiver during assigned time intervals.

10. The system as recited in claim 1, wherein the baseband sub-systems at least one of translate, code, and decode information bits so as to make the information bits compatible with the plurality of different communication standards.

11. A system, comprising:
a single transceiver configured to time division multiplex between a plurality of communication standards;
a memory;
a baseband processor coupled to the single transceiver and configured to process a signal received by the single transceiver during a first time period according to a first communication standard and store received information in the memory, and further configured to process the received information according to a second communication standard for transmission by the single transceiver during a second time period distinct from the first time period, wherein the baseband processor is further configured to configure the single transceiver for operation according to the first communication standard prior to the first time period and configure the single transceiver for operation according to the second communication standard prior to the second time period.

12. The system of claim 11, wherein the baseband processor comprises a multiple standard baseband processor.

13. The system of claim 11, wherein the baseband processor comprises:
a first baseband processor configured to operate in accordance with the first communication standard; and
a second baseband processor configured to operate in accordance with the second communication standard.

14. The system of claim 11, wherein the baseband processor is further configured to process a signal received by the single transceiver during a third time period according to the first communication standard and store received information in the memory, and wherein the baseband processor processes the received information from the first and third time periods according to the second communication standard for transmission by the single transceiver during the second time period.

15. The system of claim 11, wherein the first communication standard comprises a wireless telephone communication standard and the second communication standard comprises a communication standard selected from a list comprising a wireless LAN communication standard, a Bluetooth communication standard, and a HomeRF communication standard.

16. The system of claim 11, wherein the baseband processor is further configured to process a signal received by the single transceiver during a third time period according to the second communication standard and store received information in the memory, and further configured to process the received information according to the first communication standard for transmission by the single transceiver during a fourth time period.

* * * * *